(12) United States Patent
Paturle

(10) Patent No.: US 9,764,602 B2
(45) Date of Patent: Sep. 19, 2017

(54) VEHICLE COMPRISING MEANS FOR DETECTING NOISE GENERATED BY A TYRE

(71) Applicants: COMPAGNIE GENERALE DES ETABLISSEMENTS MICHELIN, Clermont-Ferrand (FR); Michelin Recherche et Technique S.A., Granges-Paccot (CH)

(72) Inventor: Antoine Paturle, Clermont-Ferrand (FR)

(73) Assignee: COMPAGNIE GENERALE DES ETABLISSEMENTS MICHELIN, Clermont-Ferrand (FR)

(*) Notice: Subject to any disclaimer, the term of this patent is extended or adjusted under 35 U.S.C. 154(b) by 0 days.

(21) Appl. No.: 14/652,529

(22) PCT Filed: Dec. 20, 2013

(86) PCT No.: PCT/FR2013/053240
§ 371 (c)(1),
(2) Date: Jun. 16, 2015

(87) PCT Pub. No.: WO2014/096745
PCT Pub. Date: Jun. 26, 2014

(65) Prior Publication Data
US 2015/0321522 A1   Nov. 12, 2015

(30) Foreign Application Priority Data

Dec. 21, 2012   (FR) ..................... 12 62575

(51) Int. Cl.
| H04B 1/3822 | (2015.01) |
| B60C 11/24 | (2006.01) |
| B60C 19/00 | (2006.01) |
| B60R 19/48 | (2006.01) |
| B60R 11/02 | (2006.01) |
| G01M 17/02 | (2006.01) |

(52) U.S. Cl.
CPC .............. *B60C 11/24* (2013.01); *B60C 19/00* (2013.01); *B60R 11/0247* (2013.01);
(Continued)

(58) Field of Classification Search
CPC ............ H04R 2499/13; H04R 2499/10; B60C 23/0486; B60C 11/24; B60C 19/00;
(Continued)

(56) References Cited

U.S. PATENT DOCUMENTS

| 8,731,767 B2 | 5/2014 | Paturle .................... 701/31.4 |
| 8,833,410 B2 | 9/2014 | Paturle ................... 152/154.2 |

(Continued)

FOREIGN PATENT DOCUMENTS

| DE | 10 2004 036 811 A1 | 7/2005 |
| EP | 2 468 572 A1 | 6/2012 |

(Continued)

*Primary Examiner* — Md S Elahee
*Assistant Examiner* — Sabrina Diaz
(74) *Attorney, Agent, or Firm* — Fitzpatrick, Cella, Harper & Scinto

(57) ABSTRACT

A motor vehicle includes a rear bumper and a microphone. The rear bumper includes an internal cavity that is open towards a front portion of the vehicle. The microphone includes a sound pickup component arranged to acquire a sound signal generated by at least one tire of the vehicle, each of which includes at least one audible wear indicator. The sound pickup component of the microphone is attached to a wall of the rear bumper, and is positioned at a transverse level located between rear tires of the vehicle, preferably in the internal cavity.

16 Claims, 2 Drawing Sheets

(52) U.S. Cl.
CPC .......... *B60R 19/48* (2013.01); *G01M 17/025* (2013.01); *B60C 2019/004* (2013.01)

(58) Field of Classification Search
CPC ........ B60C 2019/004; B60C 2019/007; B60R 19/48; B60R 19/023; B60R 11/0247; B60R 2021/01302
USPC ........................................ 381/71.1, 71.4, 86
See application file for complete search history.

(56) References Cited

U.S. PATENT DOCUMENTS

| | | | |
|---|---|---|---|
| 8,881,573 B2 | 11/2014 | Paturle et al. ...................... | 73/8 |
| 8,892,298 B2 | 11/2014 | Paturle et al. | |
| 8,904,869 B2 | 12/2014 | Paturle ............................ | 73/584 |
| 2004/0154715 A1* | 8/2004 | Dufournier ............. | B60C 11/24 |
| | | | 152/154.2 |
| 2010/0033313 A1* | 2/2010 | Keady .................. | G08G 1/0965 |
| | | | 340/438 |
| 2012/0266650 A1 | 10/2012 | Paturle ............................... | 73/8 |
| 2012/0273102 A1 | 11/2012 | Paturle ....................... | 152/154.2 |
| 2014/0121997 A1 | 5/2014 | Paturle ........................... | 702/34 |
| 2014/0124108 A1 | 5/2014 | Paturle ....................... | 152/154.3 |
| 2014/0130948 A1 | 5/2014 | Paturle ....................... | 152/154.2 |
| 2014/0174613 A1 | 6/2014 | Paturle et al. ............. | 152/154.2 |

FOREIGN PATENT DOCUMENTS

| | | | | |
|---|---|---|---|---|
| FR | 2 953 164 A1 | 6/2011 | | |
| JP | 08-182089 | * | 7/1996 | ............... H04R 1/34 |

* cited by examiner

VEHICLE COMPRISING MEANS FOR DETECTING NOISE GENERATED BY A TYRE

FIELD OF THE INVENTION

The present invention relates to the technical field of the detection of noise generated by one or more tyres, typically for motor vehicles such as individual or collective passenger vehicles, or utility vehicles, for example lorries or heavy-duty vehicles, or three-wheeled vehicles, etc.

RELATED ART

Methods for acquiring in real time a sound signal emitted by one or more tyres when the vehicle is moving, particularly in order to obtain information about the condition of the road, for example its degree of smoothness, or the state of wear of the tyre or tyres, are already known in the prior art.

It is also known, for example from Patent Application FR 0958586, to use at least one tyre comprising one or more audible wear indicators, this being in order to generate an acoustic fingerprint correlated with the state of wear of the tyre, allowing this to be detected in real time.

It is, in particular, possible to use a microphone to acquire the sound signal generated by the tyre, process this signal in order to eliminate certain parasitic noises, for example that generated by the engine, then break down the processed signal into separate frequency components, and finally to identify the frequencies associated with a level of wear of the tyre. The frequency components of such a signal are characteristic in relation to the distribution of the audible wear indicators and the speed of the vehicle, so that it is possible to separate from the driving acoustic signal the acoustic fingerprint generated by the audible wear indicators associated with the state of the road.

To this end, in view of the limited detection sensitivity of the microphones which can be used, as well as the presence of parasitic noise (noise of the engine, aerodynamic noise, internal and external noise), it is desirable for the intensity of the sound signals picked up coming from the tyres to be as high as possible.

It is also desirable to acquire the sound signals generated by the different tyres of the vehicle, or by only one of these tyres, when it reaches a predetermined wear threshold. In the latter case, the position of this tyre on the vehicle is generally unknown. In fact, even if several tyres are changed simultaneously, it is not possible to know which of them will reach this wear threshold first.

It is therefore necessary to be able to acquire a sound signal of sufficient intensity coming from one among several tyres of the vehicle.

It is furthermore desirable to minimise the number of microphones required, in order to limit the complexity of the signal acquisition and processing system, and the attendant costs.

It is furthermore known that the sound typically propagates in all directions and that the sound energy decreases in inverse proportion to the square of the distance. Attempts have therefore been made to acquire the sound signal emitted by the two tyres of the front axle unit by means of a single microphone arranged just under the chassis of the vehicle at the front axle unit of the vehicle, at a central transverse point. This position, equidistant from the two tyres of the front axle unit, is in fact the one which leads to the minimum distance of the microphone from these two tyres of the front axle unit.

It has, however, been observed that the intensity of the sound signal measured at this position is not sufficient. The same observation has been made for the tyres of the rear axle unit. It thus seems difficult to acquire the various sound signals which may be emitted by the various tyres of the vehicle with a satisfactory sound level using a single microphone, or a limited number of microphones.

BRIEF DESCRIPTION OF EMBODIMENTS OF THE INVENTION

The object of the invention is in particular to overcome the aforementioned problems, and to achieve satisfactory detection of the sound signals emitted either by several tyres, and preferably all the tyres of the vehicle, or by a single tyre, typically a worn tyre which may be located at different positions on the vehicle, and to do so by means of a limited number of microphones.

To this end, the invention relates to a motor vehicle comprising:
  two longitudinally offset axles, respectively referred to as the front axle and rear axle, each axle carrying at least one wheel fitted with a tyre;
  at least one rear bumper defining an internal cavity which is open towards the front of the said vehicle; and
  at least one microphone comprising a sound pickup component intended for the acquisition of a sound signal generated by at least one tyre carried by a wheel of one of the axles, this tyre optionally comprising at least one audible wear indicator,
  characterized in that the said microphone is fixed to a wall of the rear bumper so that the sound pickup component of the said microphone is arranged transversely between the two tyres of the wheels of the rear axle.

It has in fact been observed that a microphone fixed on the rear bumper, at a transverse level lying between the transverse levels of the two tyres of the wheels of the rear axle, could, with a high sound level picked up, acquire a signal coming from a tyre which may be located at one among several possible positions on the vehicle. The sound level picked up coming from a given tyre at a given position may vary as a function of the relative position of the sound pickup component and of the bumper and/or the orientation of this sound pickup component.

Unexpectedly, such an arrangement of the sound pickup component of the microphone at the rear bumper makes it possible to be able to pick up a sound signal of high intensity coming both from the tyres of the front axle unit and from those of the rear axle unit, even though the distance from the microphone to these tyres is relatively high or very high.

As is well known, the orientation of a microphone is the preferential direction of sound pickup (which is never fully uniform, even with a so-called "omnidirectional" microphone), starting from the pickup component (for example its midpoint, generally on the opposite side from the support of the microphone).

Preferably, the relative position of the sound pickup component and of the bumper and/or the orientation of this pickup component are determined in order to pick up a sound signal coming from the rear of the vehicle (the orientation of the microphone being at least partly towards the rear of the vehicle).

Advantageously, the angle formed, starting from the pickup component, between on the one hand a maximum signal pickup direction and on the other hand a horizontal direction towards the rear of the vehicle is at most 30°.

It has in fact been observed surprisingly that, under suitable conditions, it is possible to pick up a sound signal with a relatively higher level coming from the tyres of the wheels of the rear axle unit, by promoting the pickup of the sound signal coming from the rear of the vehicle rather than that coming from the front of the vehicle.

This observation is unexpected, or even paradoxical, since the wheels and the tyres of the rear axle unit like those of the front axle unit are arranged towards the front of the bumper, and therefore towards the front in relation to the microphone fixed on this bumper and to its pickup component. Without being constrained to a particular interpretation, it may be assumed that there is an acoustic effect of "sound reflection" or acoustic amplification at the bumper, in the direction towards the rear of the vehicle, which may be linked with an aerodynamic phenomenon.

In order to benefit fully from this high sound level coming from the rear of the bumper, one or more technical characteristics favouring this pickup may be implemented, depending on the detection level of the microphone used.

Typically, a so-called "omnidirectional" microphone is used for picking up the sound signal. However, the sound pickup component of such a microphone is fixed to a support arranged on one side of this component, and the sound detection in the direction of the support is partially reduced because of a screen effect induced by this support. Conversely, there is no screen effect in the opposite direction to the support, also referred to as the orientation direction of the microphone.

One characteristic favourable for the detection of a sound signal of sufficient intensity coming from the rear of the vehicle therefore consists in arranging the sound pickup component oriented substantially towards the rear of the vehicle, and for example using a microphone arranged longitudinally with respect to the vehicle, the sound pickup component being oriented towards the rear whereas the support of this component is oriented towards the front.

It is also possible to locally reduce the thickness of the bumper at the sound pickup component of the microphone, for example by means of a recess (for example a local recess of an internal wall of the bumper). A locally thin wall reduces the sound attenuation induced by the wall.

Preferably the pickup component of the microphone is arranged facing or in at least one sound passage orifice formed in a substantially vertical part of the wall of the rear bumper, that is to say in a part of the wall forming an angle of conventionally between 70° and 110°, preferably between 75° and 95°, with respect to the horizontal direction towards the rear of the vehicle, in section in a vertical and longitudinal plane.

The sound pickup orifice is preferably a through-orifice, or an orifice passing through a part of its cross section.

Furthermore, and in general according to the invention, the pickup component of the microphone is arranged preferably inside the internal cavity defined by the rear bumper. In this case, a sound signal is observed which is relatively higher than for a neighbouring position arranged outside this cavity, particularly for a sound signal coming from a tyre of the front axle unit. Without being constrained to a particular interpretation, it is possible that this acoustic effect is linked with a sound cavity effect and/or with a certain reverberation of the sound by the internal walls of the bumper.

Preferably, the vehicle comprises a rear left tyre and a rear right tyre, which are substantially symmetrical to one another with respect to a vertical longitudinal midplane of the vehicle, the distance from the pickup component to either one of these rear tyres not exceeding at most 30% of the distance to the other rear tyre, the distances from these two rear tyres preferably being substantially equal. The pickup component is in the latter case arranged at a point of the vertical and longitudinal midplane of the vehicle.

According to a first embodiment of the invention, the vehicle comprises a single microphone fixed on the rear bumper, preferably inside the internal cavity of this rear bumper.

Advantageously, the pickup component is oriented towards the rear, preferably facing or in at least one orifice formed in the wall of the bumper. Such a microphone can detect with a significant or high intensity the sound signals coming both from the tyres of the front axle unit and from those of the rear axle unit.

According to a first variant of this first embodiment, the microphone comprises a single sound pickup component.

According to a second variant of this first embodiment, the microphone comprises two sound pickup components, respectively a first component and a second component.

Advantageously, the relative position of the first pickup component with respect to the bumper and/or its orientation are determined in order to pick up a sound signal coming from the rear of the vehicle, and the relative position of the second pickup component with respect to the bumper and/or its orientation are determined in order to pick up a sound signal coming from the front of the vehicle.

Preferably, the relative positions of the two pickup components are substantially opposite, for example with respect to an axis of a common support of these two components, the first pickup component preferably being oriented towards the rear, the second pickup component preferably being oriented towards the front, and the common support preferably being arranged between the first and the second pickup components.

According to a second embodiment of the invention, the vehicle comprises a chassis and a second microphone arranged level with or under the chassis of the vehicle, preferably fixed to this chassis, this second microphone comprising a pickup component arranged on the one hand at a distance from the front axle which is at least twice as great as its distance from the rear axle, and on the other hand at a distance from a vertical longitudinal midplane of the vehicle which is less by at least 40%, preferably by at least 50%, than its distance from any vertical longitudinal plane passing through a rear tyre (mounted on a rear wheel).

Typically, at least one of the tyres mounted on the vehicle comprises at least one audible wear indicator. Preferably, all the tyres mounted on the wheels of a given axle, and preferably all the tyres mounted on the vehicle, comprise an audible wear indicator.

The invention also relates to a rear bumper for a motor vehicle, defining an internal cavity which is open towards the front of the vehicle, characterized in that this rear bumper belongs, or is intended to be fitted to, a motor vehicle as mentioned above, this bumper comprising at least one microphone fixed to a wall of this bumper, this microphone comprising at least one sound pickup component preferably arranged inside the internal cavity.

BRIEF DESCRIPTION OF THE DRAWINGS

The invention will be understood more clearly on studying the appended figures, which are provided by way of examples and do not imply any limitation, in which.

DETAILED DESCRIPTION OF EMBODIMENTS
OF THE INVENTION

Figure 1:
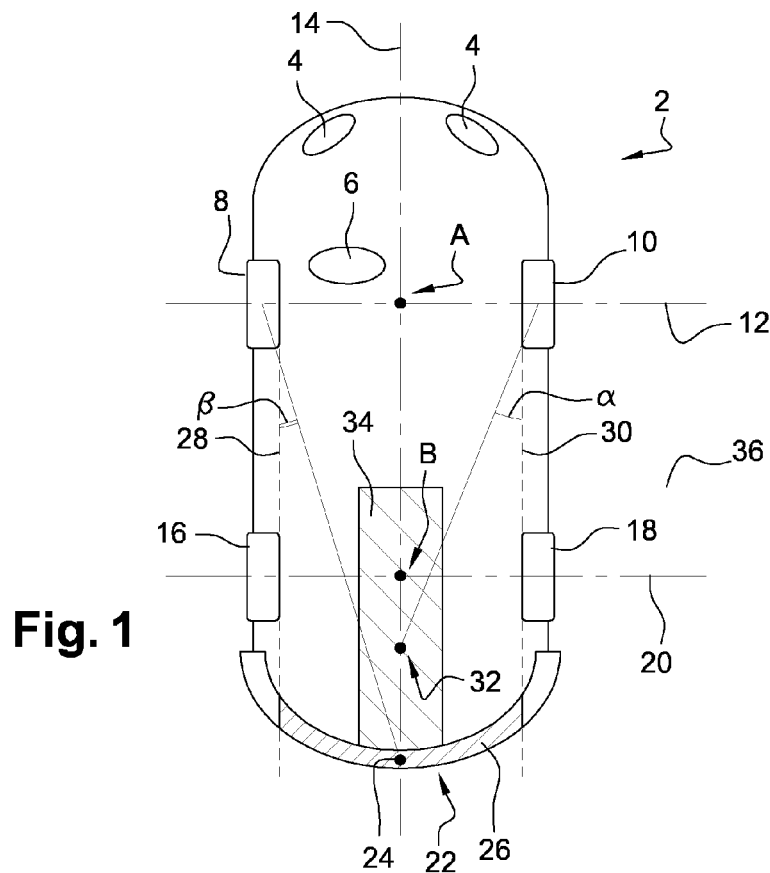
FIG. 1 partially represents a vehicle according to the invention, in a view from above.

Reference is now made to FIG. 1, which represents (schematically and partially) a motor vehicle 2 according to the second embodiment of the invention. The front of the vehicle is deduced from the position of the headlamps 4 and the steering wheel 6, these elements being represented in a view from above in order to clarify the position of the vehicle.

The vehicle comprises a front wheel axle unit, referred to as the front axle unit, formed by two front wheels equipped with two front tyres 8 and 10, which are typically centred (when the vehicle is moving in a straight line) on a transverse axis 12, referred to as the front axle unit axis.

The horizontal longitudinal axis 14 of the vehicle 2 is the horizontal longitudinal midaxis of the vehicle, which is conventionally arranged at the same height relative to the ground as the axis of the front axle unit 12. The vertical plane passing through this axis 14 is the vertical longitudinal midplane of the vehicle. This plane is a plane of symmetry for the centres of rotation of the front wheels (when the vehicle is moving in a straight line).

The vehicle also comprises two rear wheels, equipped respectively with a rear left tyre 16 and with a rear right tyre 18. The axis joining the centres of rotation of the two rear wheels is a transverse axis 20, referred to as the axis of the rear axle unit.

The vehicle 2 also comprises a rear bumper 22 defining an internal cavity open towards the front of the vehicle. The term "internal cavity" will be specified in connection with the description of FIG. 3. This bumper is equipped with a first microphone 24 fixed on an internal wall, inside the open internal cavity. In FIG. 1, the microphone 24 is arranged at the central transverse level of the midaxis 14. Other positions of this microphone are, however, possible, particularly in the hatched region 26, corresponding to the interior part of the internal cavity of the bumper, which lies at a transverse level between the two rear tyres 16 and 18 (between the transverse levels of these tyres mounted on the wheels of the rear axle). This internal part of the bumper, which is not located behind the rear tyres (and wheels), represented by the hatched region 26 is therefore delimited by two vertical and longitudinal planes 28 and 30.

The vehicle also comprises a second microphone 32, fixed not on the bumper but on the chassis of the vehicle. This second microphone is arranged at the level of chassis, or directly below this chassis, preferably at a transverse level and at a longitudinal level corresponding to the hatched region 34 arranged behind the transverse axis 36.

FIG. 1 also represents two points A and B corresponding to theoretical possible positions of the pickup component of a microphone. The point A, or midpoint of the axis of the front axle unit 12, is the point which is closest to the two front tyres 8 and 10. The point B, or midpoint of the rear transverse axis 20, is the point which is closest to the two rear tyres 16 and 18. Contrary to what might be expected, positioning the pickup component of a microphone at point A does not make it possible to pick up with a sufficient intensity a sound signal coming from one of the front tyres 8 and 10. Similarly, positioning the pickup component of a microphone at point B does not make it possible to pick up with a sufficient intensity a sound signal coming from one of the rear tyres 16 and 18.

Lastly, FIG. 1 represents the angles $\alpha$ and $\beta$, in the horizontal plane of the pickup component, formed with respect to the rear longitudinal direction by the straight lines joining the pickup component of a microphone 32 or 24 to a point of a front wheel lying longitudinally level with the axis of the front axle unit 12.

Figure 2:
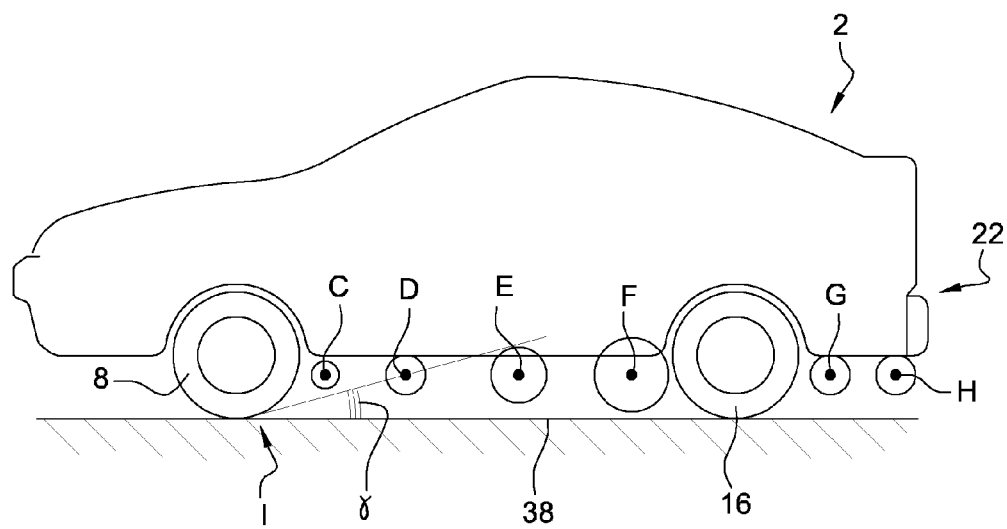
FIG. 2 represents the vehicle represented in FIG. 1, in a side view.

Reference is now made to FIG. 2, which laterally represents the vehicle of FIG. 1. FIG. 2 represents a certain number of points C, D, E, F, G, H arranged transversely on the left-hand side of the vehicle, level with the front and rear left tyres (wheels) of the vehicle, at a vertical level directly below the chassis of the vehicle. The circles around these points correspond to measurements of the intensity of the sound signal picked up at these various points, coming from only the front left tyre 8, on the basis of measurements carried out on a test rig.

Surprisingly, it is observed that the noise generated by the front left tyre and measured in the longitudinal axis of this tyre just below the chassis increases when moving away from the tyre (points C, D, E, F) then decreases again behind the rear wheel (points G and H).

Without being constrained to a particular interpretation, it is assumed that the noise emitted by the tyre is generated at the points of contact of the tyre 8 with the ground 38 (level with point I in FIG. 2) but that the tyre 8 itself can, depending on the position of the sound pickup component, form a partial screen with this source of the sound signal. Thus, depending on the angle $\gamma$ with the ground 38, the sound emitted from point I may be attenuated, particularly at the pickup points C and D, because of the effect of the partial or full screen resulting from the tyre 8 itself. The maximum sound intensity is measured at point F, i.e. relatively far from the tyre 8 generating the signal, which corresponds to a small angle $\gamma$ with the ground. Conversely, the sound intensity decreases behind the rear tyre 16, probably because of the screen effect of this rear tyre.

It has therefore been found that it is very important to take into account the screen effect generated by the different tyres, including the tyre generating the sound signal, and that this effect unexpectedly turns out to predominate over the effect of the distance to the sound pickup component.

Referring again to FIG. 1, it has furthermore been found that in a horizontal plane close to the chassis of the vehicle, in order to obtain a sound signal of high intensity it is important for the value of the angle $\alpha$ (or $\beta$) to be relatively small, since the sound seems to develop mainly towards the rear of the vehicle, with a region of high-intensity sound signal corresponding substantially to a relatively intense "noise cone" of longitudinal axis, the sound intensity decreasing progressively when the values of the angles $\alpha$ (or $\beta$) and $\gamma$ increase, outside this noise cone.

Thus, despite an increased distance from the sound source located level with the front axle unit, it has been found that the rear bumper proves to be a satisfactory region for picking up the sound signal emitted by a front tyre, because the angles $\alpha$ (or $\beta$) and $\gamma$ are relatively small. According to the invention, however, the sound pickup component of the microphone is not located behind one of the rear tyres 16, 18, in order to avoid a screen effect due to this tyre, but along a transverse axis between (the transverse levels of) these tyres, and preferably in the internal cavity of the bumper (in the part 26 of this internal cavity which is not arranged behind one of the rear tyres).

The sound signal remains relatively high in the region 26 when moving away from the longitudinal midaxis 14. This could be due to a sound cavity effect and/or to reverberation of the sound signal by the internal walls of the bumper.

Furthermore, it has been found that the region 34 represented in FIG. 1, which is a region of points of the chassis or points arranged below the chassis, which are relatively close to the midaxis and in relation to the rear of the vehicle, is also a region favourable for picking up the sound signal emitted by a front tyre, because it seems that the values of the angles α (or β) and γ corresponding to these points are relatively small. This region 34 corresponds to points combining two criteria: On the one hand the distance from a point in this region 34 to the front axle is at least twice as great as the distance from this point to the rear axle. On the other hand, the distance from the point to a vertical longitudinal midplane of the vehicle is less by at least 40% than the distance from it to any vertical longitudinal plane passing through a rear tyre 16, 18. This region 34 thus makes it possible to install a second microphone, typically fixed to the chassis, dedicated to picking up the sound signals coming from the front tyres. The pickup component of this second microphone is then advantageously oriented towards the front.

Figure 3:
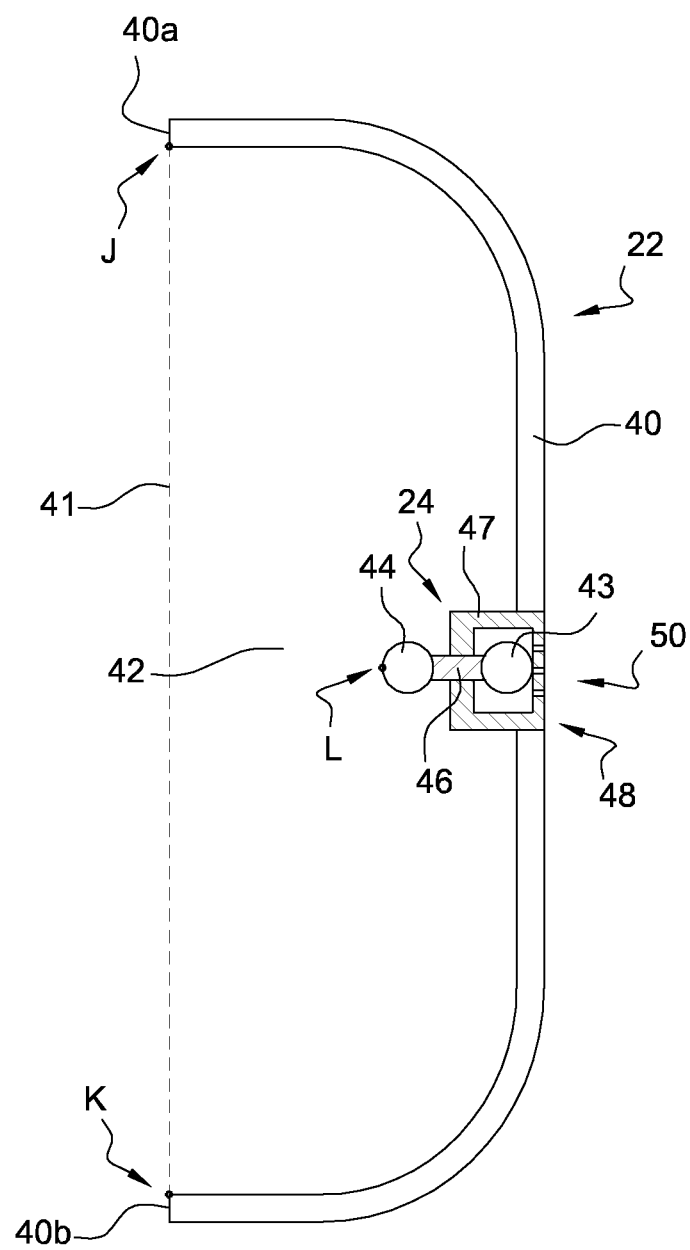
FIG. 3 represents a vertical and longitudinal cross section of a bumper according to the invention, at a microphone fixed to this bumper.

Reference is now made to FIG. 3, which represents in vertical section in a longitudinal plane a rear bumper 22 comprising a physical wall 40 (for example made of metal, composite material or the like) delimited at its end by an upper edge 40a and a lower edge 40b. This rear bumper 22 defines an open internal cavity 42 oriented towards the front of the vehicle, contained between the wall 40 and a (fictitious) surface 41 joining the upper edge 40a, on which the point J is located, and the lower edge 40b on which the point K is located. The surface 41 is generated by segments JK arranged in vertical and longitudinal planes. A given point M (which is not a point internal to the physical wall 40) conventionally belongs to the internal cavity 42 if it is possible to define a segment OP comprising this point M (in the broad sense, M may coincide with O or P) such that O and P are two points of a surface of a wall 40 of the rear bumper arranged in the same vertical and longitudinal plane.

The rear bumper 22 comprises a microphone 24, preferably the only microphone, which comprises a first pickup component 43 oriented towards the rear of the vehicle and dedicated to picking up the sound signals emitted by the tyres 16, 18 of the rear axle unit. It also comprises a second pickup component 44 oriented towards the front of the vehicle and dedicated to picking up the sound signals emitted by the tyres 8, 10 of the front axle unit.

The first pickup component 43 and the second pickup component 44 are arranged on either side of a common support 46, which is an integral part of the microphone 24.

This microphone 24 is supported by a support element 47, which is itself inserted into an orifice 48 formed in the wall 40 of the bumper. The support element 47 may be fixed to the bumper by adhesive bonding, screwing, binding or any other means. It comprises a thin wall 50 for protecting the microphone 24, comprising one or more through-orifices for the sound to pass through, typically of relatively small diameter.

The orifice 48 in the wall 40 is closed by the support element 47. Conventionally, however, the first pickup component 43 is considered to be arranged in the orifice 48 formed in the wall 40, this orifice 48 being considered to be a "sound passage orifice" because it allows the sound coming from the rear of the vehicle to pass through the thin wall 50. Furthermore, this thin wall 50 comprises small through-orifices for the sound to pass through.

The first pickup component 43, considered to be arranged inside the internal cavity of the rear bumper, even though being positioned at a level corresponding to the thickness of this wall 40.

Lastly, conventionally, the position of the pickup component is that of the point of this component which is arranged on the opposite side from the support of this component, i.e. the point L for the second pickup component 44.

The first pickup component 43 picks up very satisfactorily the sound signals generated by the tyres 16, 18 of the rear axle unit, which are picked up optimally by orienting the component 44 towards the rear of the vehicle because of an observed acoustic effect of "sound reflection" or acoustic amplification, which may be linked with an aerodynamic phenomenon.

The second pickup component 44 picks up very satisfactorily the sound signals generated by the tyres 8, 10 of the front axle unit, which are picked up optimally by orienting the component 44 towards the front of the vehicle.

This highly satisfactorily pickup of the sound signals emitted both by the tyres of the front axle unit and by those of the rear axle unit makes it possible to use a microphone with inferior performance, of which the detection threshold of each pickup component is relatively higher than in the case of using a single pickup component, which cannot be oriented optimally for detecting the signal generated by all the tyres.

In combination with the support 46, the support element 47 forms a screen between the two pickup components 43 and 44. Thus, each of these pickup components principally receives the sound signals coming from only one of the front and rear sets of tyres of the vehicle.

This embodiment of the invention as represented very partially in FIG. 3 therefore corresponds typically to the first embodiment of the invention, of the type with a single microphone, as opposed to the embodiment of FIG. 1 (comprising two separate microphones 24 and 32).

The invention is not limited to the embodiments presented, and other embodiments will be readily apparent to the person skilled in the art. In particular, it is possible to use any suitable additional technical element already known in the prior art in conjunction with an embodiment of the invention.

The invention claimed is:

1. A motor vehicle, comprising:
a front axle and a rear axle positioned longitudinally offset from each other, the front axle and the rear axle each carrying at least two wheels, each wheel being fitted with a tyre;
a rear bumper structured to include an internal cavity that is open towards a front portion of the vehicle; and
a microphone, which includes a sound pickup component arranged to acquire a sound signal emitted by the tyres of the wheels of the front axle and the tyres of the wheels of the rear axle,
wherein the microphone is positioned within the internal cavity and is fixed to a wall of the rear bumper so that the sound pickup component of the microphone is arranged within the internal cavity transversely between two rear tyres of two rear wheels of the rear axle.

2. The motor vehicle according to claim 1, wherein the at least one of the tyres each includes at least one audible wear indicator.

3. The motor vehicle according to claim 1, wherein an orientation of the sound pickup component is determined with respect to the rear bumper so as to detect a sound signal coming from a rear portion of the vehicle.

4. The motor vehicle according to claim 3, wherein, with respect to the sound pickup component, an angle formed between a maximum-signal pickup direction and a horizontal direction towards the rear portion of vehicle is at most 30°.

5. The motor vehicle according to claim 1, wherein a position of the sound pickup component is determined with respect to the rear bumper so as to detect a sound signal coming from the rear portion of the vehicle.

6. The motor vehicle according to claim 5, wherein the sound pickup component is arranged in or to face a sound passage orifice formed in a substantially vertical part of the wall of the rear bumper.

7. The motor vehicle according to claim 1, wherein the sound pickup component is arranged inside the internal cavity of the rear bumper.

8. The motor vehicle according to claim 1,
wherein the rear axle includes a rear left tyre and a rear right tyre, the rear left and right tyres being positioned substantially symmetrical to one another with respect to a vertical longitudinal midplane of the vehicle, and
wherein a distance from the sound pickup component to one of the rear left and right tyres does not exceed 30% of a distance to another of the rear left and right tyres.

9. The motor vehicle according to claim 8, wherein the distance from the sound pickup component to the one of the rear left and right tyres and the distance to the other of the rear left and right tyres are substantially equal.

10. The motor vehicle according to claim 1, wherein the motor vehicle includes a single microphone corresponding to the microphone.

11. The motor vehicle according to claim 10, wherein the single microphone includes a single sound pickup component.

12. The motor vehicle according to claim 10, wherein the single microphone includes at least a first sound pickup component and a second sound pickup component.

13. The motor vehicle according to claim 1, further comprising:
a chassis; and
a chassis microphone located at a position level with or under the chassis,
wherein the chassis microphone includes a sound pickup component arranged at a distance from the front axle that is at least twice as great as a distance from the rear axle, and arranged at a distance from a vertical longitudinal midplane of the vehicle that is at least 40% less than a distance from any vertical longitudinal plane passing through one or both of the two rear tyres.

14. A motor vehicle comprising:
a front axle and a rear axle positioned longitudinally offset from each other, the front axle and the rear axle each carrying at least two wheels, each wheel being fitted with a tyre;
a rear bumper structured to include an internal cavity that is open towards a front portion of the vehicle; and
a single microphone, which includes at least a first sound pickup component and a second sound pickup component arranged to acquire a sound signal generated by at least one of the tyres,
wherein the single microphone is fixed to a wall of the rear bumper so that one of the sound pickup components of the microphone is arranged transversely between two rear tyres of two rear wheels of the rear axle,
wherein one or both of a relative position of the first sound pickup component with respect to the rear bumper and an orientation of the first sound pickup component with respect to the rear bumper is or are determined so as to pick up a sound signal coming from a rear portion of the vehicle, and
wherein one or both of a relative position of the second sound pickup component with respect to the rear bumper and an orientation of the second sound pickup component with respect to the rear bumper is or are determined so as to pick up a sound signal coming from the front portion of the vehicle.

15. The motor vehicle according to claim 14, wherein the relative positions of the first and second sound pickup components are substantially opposite each other with respect to a common support structure, with the common support structured being arranged between and supporting the first and second sound pickup components, with the first sound pickup component being oriented rearwards, and with the second sound pickup component being oriented frontwards.

16. A rear bumper for a motor vehicle having a front axle and a rear axle positioned longitudinally offset from each other, the front axle and the rear axle each carrying at least two wheels, each wheel being fitted with a tyre, the rear bumper comprising:
a wall defining an internal cavity that is structured to open towards a front portion of the vehicle; and
a microphone that includes a sound pickup component arranged to acquire a sound signal emitted by the tyres of the wheels of the front axle and the tyres of the wheels of the rear axle,
wherein the microphone is attached to the wall and is arranged inside the internal cavity, so that the sound pickup component is positioned within the internal cavity transversely between two rear tyres of two rear wheels of the rear axle of the vehicle.

* * * * *

UNITED STATES PATENT AND TRADEMARK OFFICE
CERTIFICATE OF CORRECTION

| | |
|---|---|
| PATENT NO. | : 9,764,602 B2 |
| APPLICATION NO. | : 14/652529 |
| DATED | : September 19, 2017 |
| INVENTOR(S) | : Antoine Paturle |

It is certified that error appears in the above-identified patent and that said Letters Patent is hereby corrected as shown below:

In the Specification

<u>Column 8:</u>
Line 3, "43, considered" should read --43 is considered--.
Line 5, "being" should read --it is--.
Line 22, "satisfactorily" should read --satisfactory--.

In the Claims

<u>Column 10:</u>
Line 32, Claim 15 "structured" should read --structure--.

Signed and Sealed this
Thirty-first Day of July, 2018

Andrei Iancu
*Director of the United States Patent and Trademark Office*